(12) United States Patent
Flore et al.

(10) Patent No.: US 8,553,643 B2
(45) Date of Patent: Oct. 8, 2013

(54) INTER-SYSTEM HANDOVER USING LEGACY INTERFACE

(75) Inventors: Oronzo Flore, San Diego, CA (US);
Francesco Grilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1825 days.

(21) Appl. No.: 11/486,751

(22) Filed: Jul. 14, 2006

(65) Prior Publication Data
US 2007/0021120 A1      Jan. 25, 2007

Related U.S. Application Data

(60) Provisional application No. 60/701,240, filed on Jul. 19, 2005.

(51) Int. Cl.
*H04W 4/00* (2009.01)
(52) U.S. Cl.
USPC ............................ 370/331; 455/436; 455/438
(58) Field of Classification Search
USPC ............... 370/331–334; 455/422.1, 436–444
See application file for complete search history.

(56) References Cited

U.S. PATENT DOCUMENTS

| | | | |
|---|---|---|---|
| 6,438,117 B1 | 8/2002 | Grilli et al. | |
| 2003/0114158 A1* | 6/2003 | Soderbacka et al. | 455/436 |
| 2004/0114615 A1 | 6/2004 | Virtanen et al. | |
| 2006/0128394 A1* | 6/2006 | Turina et al. | 455/453 |
| 2006/0268849 A1* | 11/2006 | Larsson et al. | 370/356 |
| 2006/0276190 A1* | 12/2006 | Shaheen | 455/436 |
| 2007/0225001 A1* | 9/2007 | Heino et al. | 455/446 |
| 2008/0019338 A1* | 1/2008 | Ishii et al. | 370/338 |
| 2008/0064405 A1* | 3/2008 | Rasanen | 455/436 |
| 2008/0267405 A1* | 10/2008 | Vialen et al. | 380/270 |

FOREIGN PATENT DOCUMENTS

| | | | |
|---|---|---|---|
| EP | 1102511 A1 | | 5/2001 |
| GB | 2378090 A | * | 1/2003 |
| JP | 2002158714 A | | 5/2002 |
| JP | 2003198446 A | | 7/2003 |
| JP | 2005529540 T | | 9/2005 |
| TW | 200427246 | | 12/2004 |
| TW | 200503563 | | 1/2005 |

(Continued)

OTHER PUBLICATIONS

3GPP2, CDMA2000 High Rate Packet Data Air Interface Specification, Sep. 12, 2000, sections 7-1 to 7-30.

(Continued)

*Primary Examiner* — Ajit Patel
(74) *Attorney, Agent, or Firm* — François A. Pelaez (57) ABSTRACT

Techniques for performing inter-system handover are described. An Access Gateway (AGW) sends a message requesting handover of a user equipment (UE) from a first radio access network (RAN) to a second RAN. The message is sent to an Inter Access System (inter-AS) Anchor for the first RAN communicating with an SGSN for the second RAN via a Gn interface. The Inter-AS Anchor and SGSN exchange messages via the Gn interface, and the Inter-AS Anchor forwards the messages to the AGW to handover the UE from the first RAN to the second RAN. The SGSN sees the Inter-AS Anchor as another SGSN for the handover and as a GGSN after the handover. This allows the inter-system handover to be achieved with an inter-SGSN SRNS relocation procedure used for handover between two SGSNs, which reduces impact on the SGSN to support the inter-system handover.

34 Claims, 10 Drawing Sheets

(56) References Cited

FOREIGN PATENT DOCUMENTS

| WO | 02/067617 A1 | 8/2002 |
|---|---|---|
| WO | WO03105380 A1 | 12/2003 |
| WO | WO2006124950 A2 | 11/2006 |
| WO | WO2007007990 A1 | 1/2007 |
| WO | WO2007011983 | 1/2007 |

OTHER PUBLICATIONS

TIA/EIA/IS-95, Mobile Station-Base Station Compatibility Standard for Dual-Mode Wideband Spread Spectrum Cellular System, Jul. 1993.

TIA/EIA/IS-2000.1-C. "Introduction to cdma2000 Standards for Spread Spectrum Systems—Release C," May 28, 2002.

3GPP TS 23.002, "Network Architecture," Mar. 2006.

3GPP TS 29.060, "GPRS Tunnelling Protocol (GTP) across Gn and Gp Interface," Jun. 2006.

3GPP TR 25.912, "Feasibility Study for Evolved UTRA and UTRAN," Jun. 2006.

International Search Report, PCT/US06/027967, International Search Authority, European Patent Office, Nov. 22, 2006.

3GPP TR 25. 913 ,"3rd Genereation Partnership Project Technical Specification Group Radio Access Network Requirements for Evolved UTRAN (E-UTRA) and Evolved UTRAN (E-UTRAN) Release 7" v7. 0. 0 Jun. 30, 2005 Lines 20-37 on p. 11.

3GPP TS 43.129 V6.3.0, Jun. 2005, pp. 10-17, 35-40, 45-50, URL:http://3gpp.org/ftp/Specs/archive/43_series/43.129/43129-630.zip.

Taiwan Search Report—TW095126423—TIPO—Sep. 17, 2011.

* cited by examiner

1. UE connected to E-UTRAN

4. UE communicating with UTRAN

INTER-SYSTEM HANDOVER USING LEGACY INTERFACE

CLAIM OF PRIORITY UNDER 35 U.S.C. §119

The present Application for Patent claims priority to Provisional Application Ser. No. 60/701,240, entitled "Gn-Based Handover between a New Access System and the UMTS," filed Jul. 19, 2005, assigned to the assignee hereof, and expressly incorporated herein by reference.

BACKGROUND

I. Field

The present disclosure relates generally to communication, and more specifically to techniques for performing handover between wireless communication networks using different radio access technologies.

II. Background

Wireless communication networks are widely deployed to provide various communication services such as voice, video, packet data, messaging, broadcast, and so on. These networks may be multiple-access networks capable of supporting communication for multiple users by sharing the available network resources. Examples of such multiple-access networks include Code Division Multiple Access (CDMA) networks, Time Division Multiple Access (TDMA) networks, and Frequency Division Multiple Access (FDMA) networks. A CDMA network may implement a radio access technology (RAT) such as cdma2000 or Wideband-CDMA (W-CDMA). cdma2000 covers IS-2000, IS-95 and IS-856 standards. A TDMA network may implement a RAT such as Global System for Mobile Communications (GSM). W-CDMA and GSM are described in documents from an organization named "3rd Generation Partnership Project" (3GPP). cdma2000 is described in documents from an organization named "3rd Generation Partnership Project 2" (3GPP2). These various RATs and standards are known in the art.

Data usage for wireless communication networks continually grows due to increasing number of users as well as emergence of new applications with higher data requirements. Consequently, new wireless networks with enhanced performance are continually developed and deployed. Second-generation (2G) wireless networks such as GSM and IS-95 networks can provide voice and low rate data services. Third-generation (3G) wireless networks such as Universal Mobile Telecommunication System (UMTS) networks (which implement W-CDMA) and CDMA2000 1X networks (which implement IS-2000) can support concurrent voice and data services, higher data rates, and other enhanced features. Next generation wireless networks will likely provide higher performance and more features than existing 2G and 3G wireless networks.

A major challenge in development and deployment of a new wireless network is interoperability with existing wireless networks. It is desirable for a wireless user to be able to roam seamlessly between the new wireless network and existing wireless networks. This would allow the user to enjoy the performance advantages of the new wireless network and the coverage benefits of the existing wireless networks.

SUMMARY

Techniques for performing inter-system handover of a user equipment (UE) from a first radio access network (RAN) to a second RAN are described herein. The second RAN may be a Universal Terrestrial Radio Access Network (UTRAN), and the first RAN may be an Evolved UTRAN (E-UTRAN), or vice versa. The E-UTRAN is a new RAN with enhanced performance. The first and second RANs may also be RANs of other radio access technologies.

According to an embodiment of the invention, an apparatus (e.g., a UE) is described which includes at least one processor and a memory. The processor(s) communicate with the first RAN, receive a message to handover from the first RAN to the second RAN, and perform reconfiguration for handover from the first RAN to the second RAN, e.g., bring down a first protocol stack for the first RAN and bring up a second protocol stack for the second RAN. The processor(s) communicate with the second RAN after the handover. The handover is achieved by exchanging messages between a first network entity for the first RAN and a second network entity for the second RAN. The first network entity may be an Inter Access System (Inter-AS) Anchor, and the second network entity may be a Serving GPRS Support Node (SGSN). The first and second network entities communicate via a legacy Gn interface.

According to another embodiment, an apparatus (e.g., an Access Gateway (AGW)) is described which includes at least one processor and a memory. The processor(s) send to the first network entity a message requesting handover of the UE from the first RAN to the second RAN. The processor(s) exchange messages with the second network entity via the first network entity to handover the UE from the first RAN to the second RAN. The processor(s) also send a message to the UE to perform handover from the first RAN to the second RAN.

According to yet another embodiment, an apparatus (e.g., an Inter-AS Anchor) is described which includes at least one processor and a memory. The processor(s) receive a message requesting handover of the UE from the first RAN to the second RAN and exchange messages with the SGSN via the Gn interface to handover the UE from the first RAN to the second RAN.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The inter-system handover techniques described herein may be used for various wireless communication networks such as CDMA, TDMA, FDMA, and Orthogonal FDMA (OFDMA) networks. The terms "network" and "system" are often used interchangeably. For clarity, the techniques are described below for 3GPP-based networks.

Figure 1:
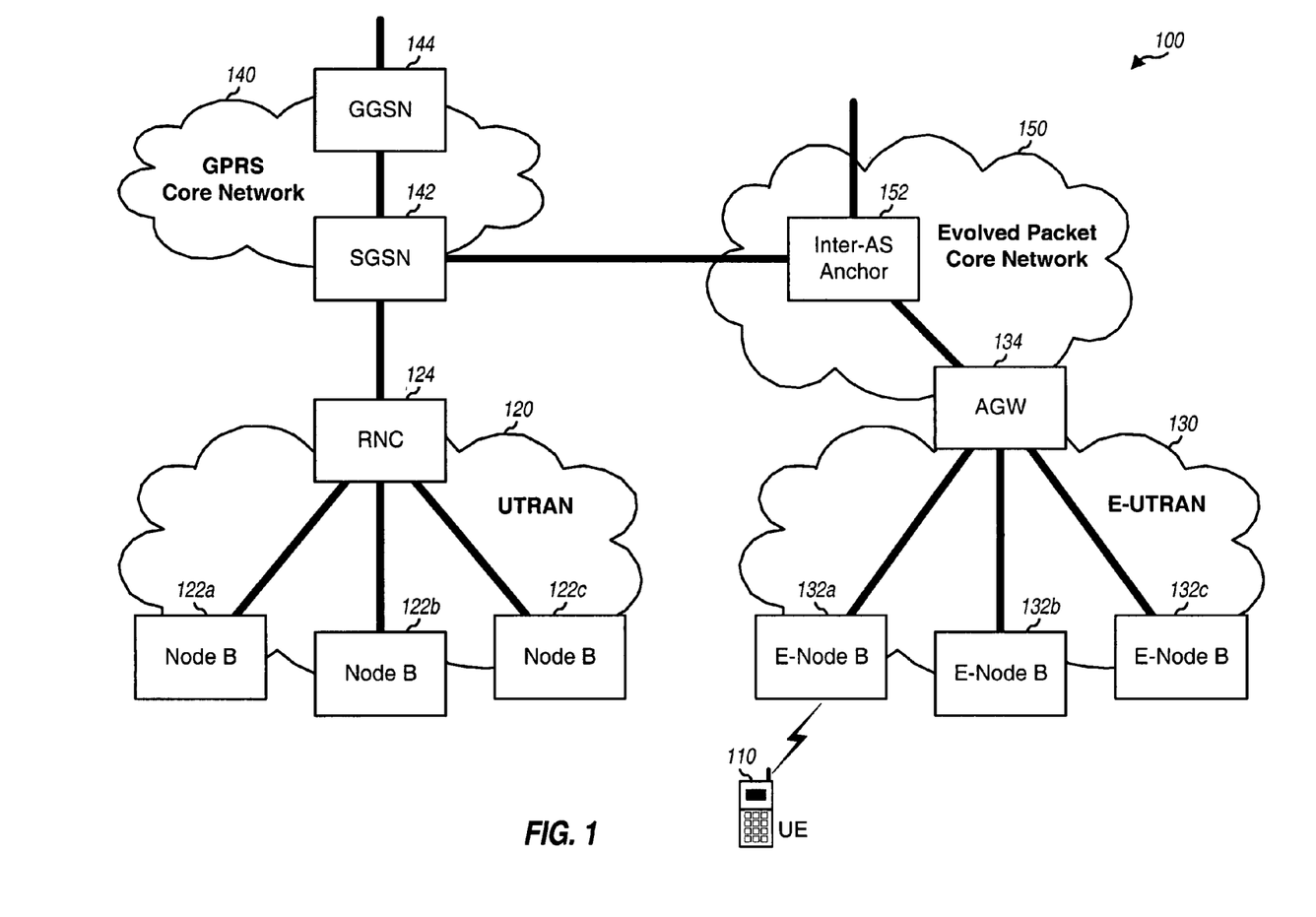
FIG. 1 shows a deployment with a UTRAN and an E-UTRAN.

FIG. 1 shows an exemplary deployment 100 with a UTRAN 120, an E-UTRAN 130, a General Packet Radio Service (GPRS) core network 140, and an Evolved Packet Core (EPC) network 150.

UTRAN 120 includes Node Bs coupled to Radio Network Controllers (RNCs). For simplicity, only three Node Bs 122a, 122b and 122c and one RNC 124 are shown in FIG. 1. A Node B may also be referred to as a base station, an access point, or some other terminology. Node Bs 122 provide radio communication for UEs within their coverage. RNC 124 provides control for Node Bs 122 and perform radio resource management, some mobility management functions, and other functions to support communication between the UEs and the UTRAN.

E-UTRAN 130 includes Evolved Node Bs coupled to Access Gateways. An Evolved Node B may also be referred to as a base station, an E-Node B, an eNode B, an eNB, and so on. An Access Gateway may also be referred to as an AGW, an aGW, an anchor, and so on. For simplicity, only three E-Node Bs 132a, 132b and 132c and one AGW 134 are shown in FIG. 1. E-Node Bs 132 provide radio communication for UEs within their coverage and may perform radio resource management. AGW 134 provides control for E-Node Bs 132. AGW 134 may include a Mobility Management Entity (MME) and a User Plane Entity (UPE). The MME may perform mobility management functions, e.g., distribution of paging messages to the E-Node Bs. The UPE may perform functions to support data exchanges on a user plane.

GPRS core network 140 includes a Serving GPRS Support Node (SGSN) 142 coupled to a Gateway GPRS Support Node (GGSN) 144. SGSN 142 facilitates exchanges of packets between RANs and GGSN 144 and also performs mobility management for UEs. GGSN 144 performs routing function and exchanges packets with external data networks. SGSN 142 interfaces with RNC 124 in UTRAN 120 and supports packet-switched services for the UEs communicating with the UTRAN.

Evolved Packet Core network 150 includes an Inter Access System Anchor (IASA) 152, which may also be referred to as an Inter-AS Anchor or some other terminology. AGW 134 may perform some functions for E-UTRAN 130 and some functions for Evolved Packet Core network 150 and is shown as part of both networks in FIG. 1. Inter-AS Anchor 152 interfaces with AGW 134 and also with SGSN 142 in GPRS core network 140. Inter-AS Anchor 152 provides interoperability between E-UTRAN 130 and UTRAN 120 and GPRS core network 140. Inter-AS Anchor 152 may communicate with SGSN 142 via a Gn interface, which is a legacy interface between SGSNs and GGSNs within a GPRS core network. The use of the Gn interface allows SGSN 142 to communicate with Inter-AS Anchor 152 in the same manner as with another SGSN, which minimizes impact to legacy networks 120 and 140 to interoperate with new networks 130 and 150.

The network entities in UTRAN 120 and GPRS core network 140 are described in 3GPP TS 23.002, entitled "Network architecture," March 2006. The network entities in E-UTRAN 130 and Evolved Packet Core network 150 are described in 3GPP TR 25.912, entitled "Feasibility Study for Evolved UTRA and UTRAN," June 2006. These documents are publicly available.

A UE 110 may be capable of communicating with UTRAN 120 and E-UTRAN 130. UE 110 may also be referred to as a mobile station, an access terminal, or some other terminology. UE 110 may be a cellular phone, a personal digital assistant (PDA), a subscriber unit, a wireless modem, a wireless device, a terminal, and so on.

UE 110 may communicate with UTRAN 120 or E-UTRAN 130 via a control plane and a user plane. A control plane is a mechanism for carrying signaling for higher-layer applications and may be implemented with network-specific protocols and signaling messages. A user plane is a mechanism for carrying data for higher-layer applications and employs a user-plane bearer, which is typically implemented with protocols such as User Datagram Protocol (UDP), Transmission Control Protocol (TCP), and Internet Protocol (IP). UE 110 utilizes different protocols for the control plane and user plane.

Figure 2A:
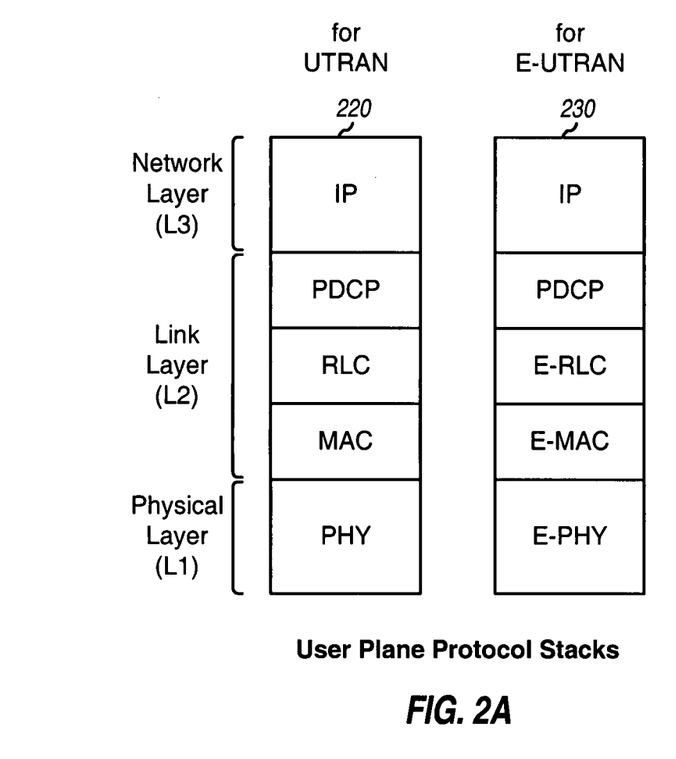
FIG. 2A shows protocol stacks for a user plane.

FIG. 2A shows exemplary protocol stacks 220 and 230 at UE 110 for communication with UTRAN 120 and E-UTRAN 130, respectively, on the user plane. Protocol stacks 220 and 230 include a network layer, a link layer, and a physical layer. For protocol stack 220, the network layer includes IP. The link layer includes Packet Data Convergence Protocol (PDCP), Radio Link Control (RLC), and Medium Access Control (MAC). The physical layer is W-CDMA air-interface (PHY). For protocol stack 230, the network layer includes IP. The link layer includes PDCP, Evolved RLC (E-RLC), and Evolved MAC (E-MAC). The physical layer is an evolved air-interface (E-PHY). UE 110 exchanges IP packets with SGSN 142 or AGW 134 via IP and PDCP. UE 110 communicates via RLC, MAC, and PHY with a Node B in UTRAN 120 to exchange the IP packets. UE 110 communicates via E-RLC, E-MAC, and E-PHY with an E-Node B in E-UTRAN 130 to exchange the IP packets. UE 110 uses protocol stack 220 when communicating with UTRAN 120 and uses protocol stack 230 when communicating with E-UTRAN 130.

Figure 2B:
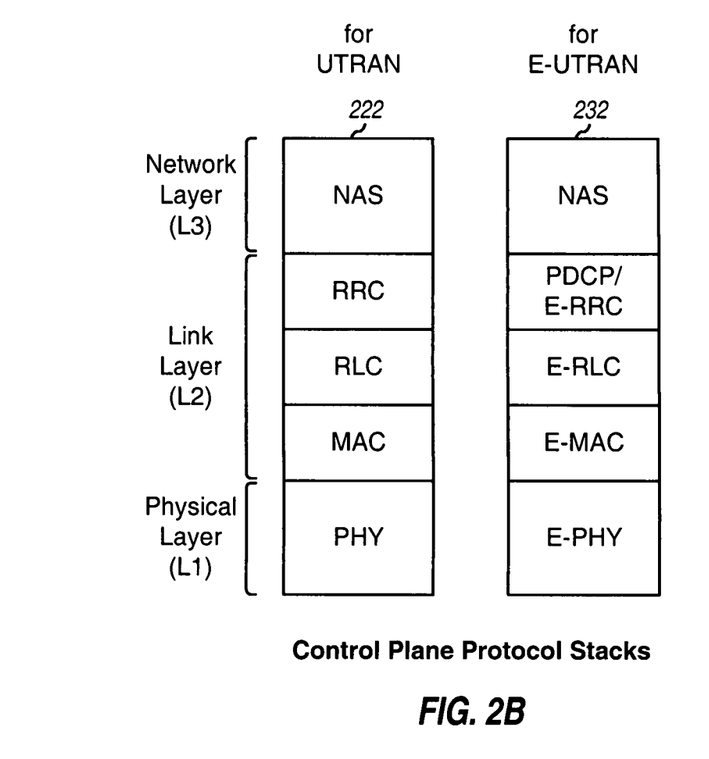
FIG. 2B shows protocol stacks for a control plane.

FIG. 2B shows exemplary protocol stacks 222 and 232 at UE 110 for communication with UTRAN 120 and E-UTRAN 130, respectively, on the control plane. For protocol stack 222, the network layer includes Non Access Stratum (NAS). The link layer includes Radio Resource Control (RRC), RLC, and MAC. The physical layer is PHY. For protocol stack 232, the network layer includes NAS. The link layer may include PDCP, Evolved RRC (E-RRC), E-RLC, and E-MAC (as shown in FIG. 2B) or may include E-RRC, E-RLC, and E-MAC (not shown in FIG. 2B). The physical layer is E-PHY. UE 110 exchanges signaling with RRC 124 via NAS. UE 110 communicates via RLC, MAC, and PHY with a Node B in UTRAN 120 to exchange the signaling. UE 110 may exchange signaling with AGW 134 via NAS and possibly PDCP. UE 110 communicates via E-RLC, E-MAC, and E-PHY with an E-Node B in E-UTRAN 130 to exchange the signaling. UE 110 uses protocol stack 222 when communicating with UTRAN 120 and uses protocol stack 232 when communicating with E-UTRAN 130.

The protocols for UTRAN 120 are described in a book from Harri Holma et al., entitled "W-CDMA for UMTS," Section 7, 2001. The protocols for E-UTRAN are described in the aforementioned 3GPP TR 25.912.

Figure 3A:
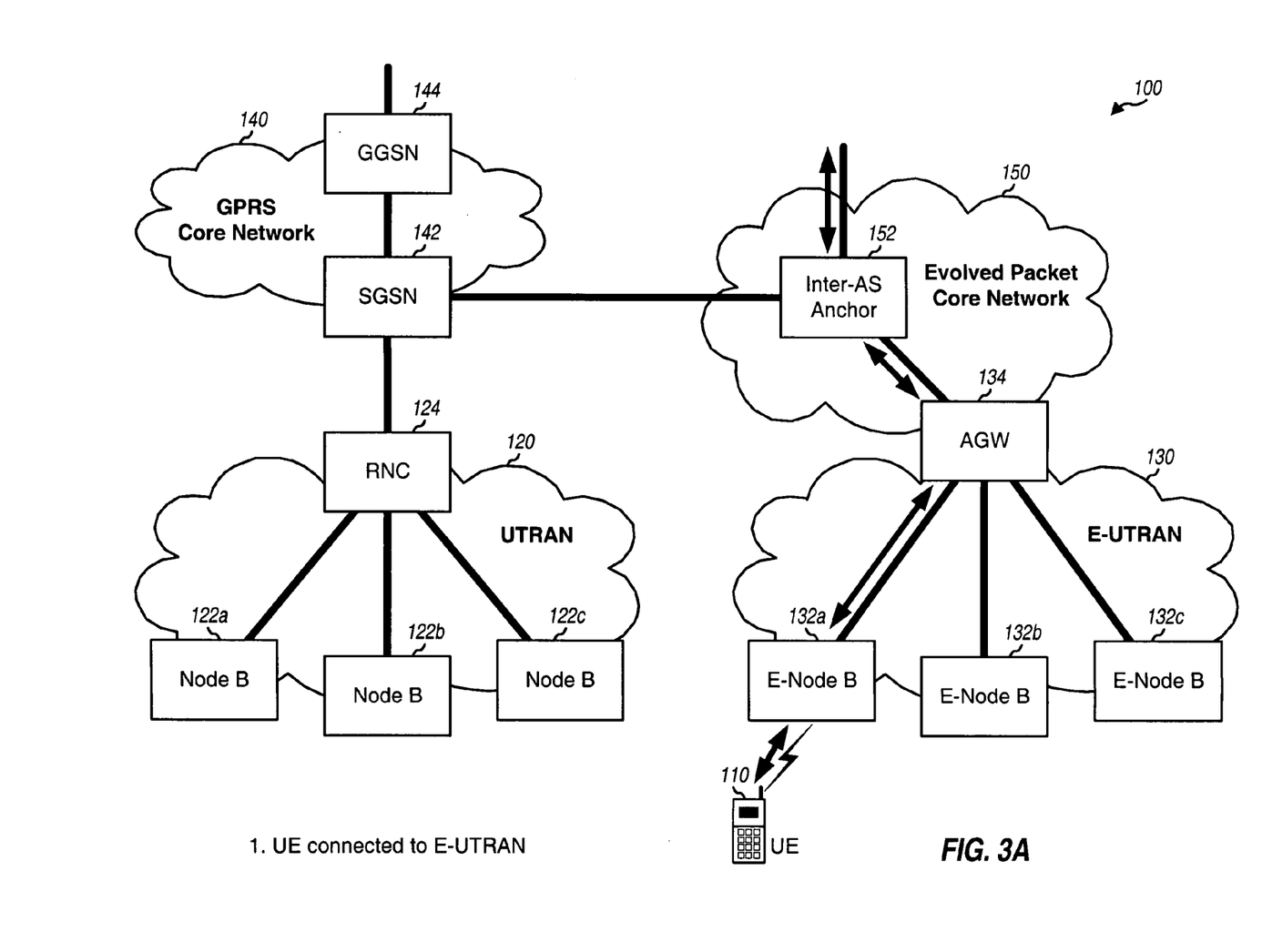
FIGS. 3A to 3D illustrate handover of a UE from the E-UTRAN to the UTRAN.

FIG. 3A shows communication between UE 110 and E-UTRAN 130. UE 110 communicates with E-Node B 132c via E-RLC, E-MAC, and E-PHY. UE 110 exchanges data with AGW 134 via IP and PDCP and further exchanges signaling with AGW 134 via NAS and PDCP. E-Node B 132 communicates with AGW 134 via an S1 interface. AGW 134 may route data for UE 110 to other devices located outside of E-UTRAN 130.

Figure 3B:
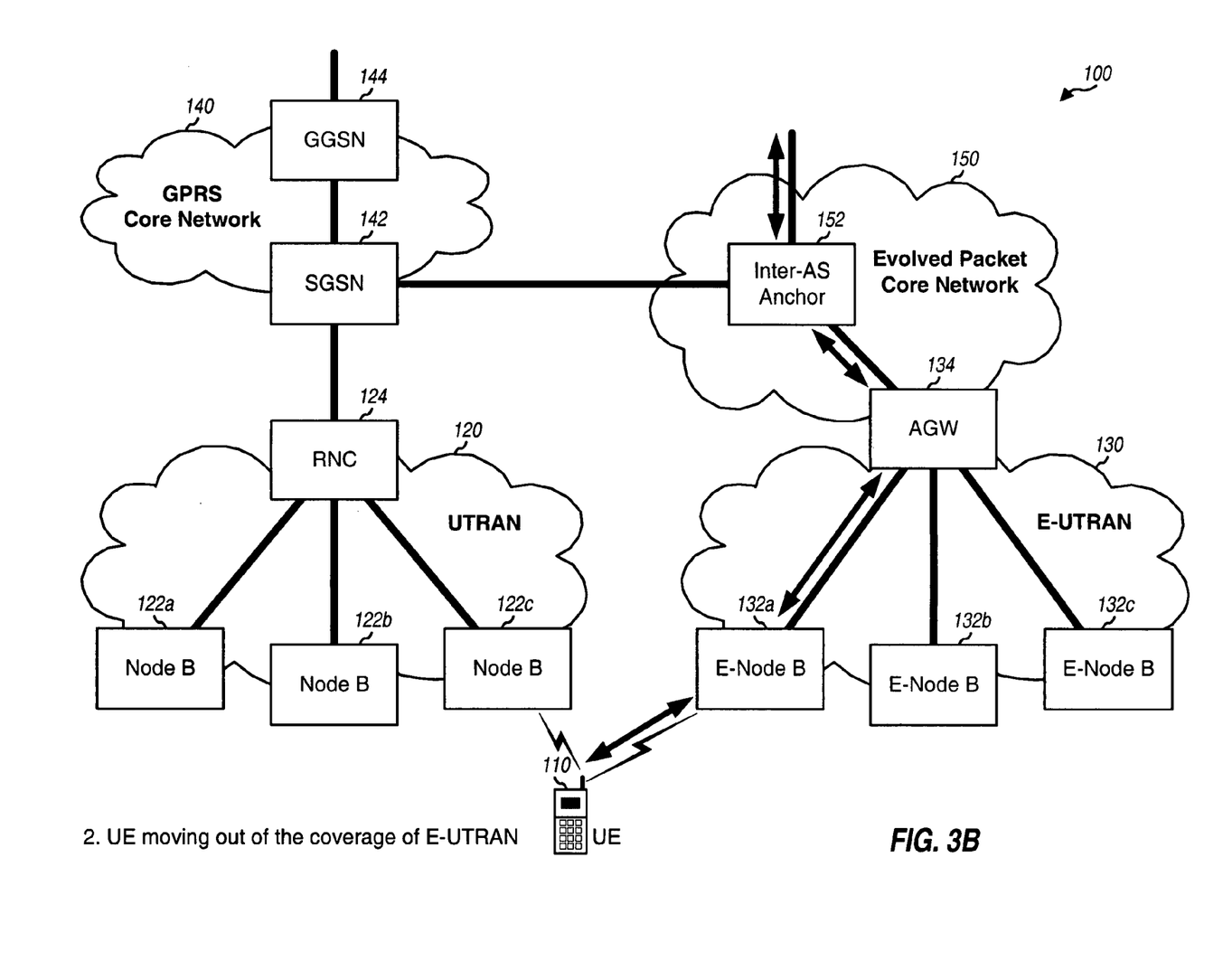

FIG. 3B shows UE 110 moving out of the coverage of E-UTRAN 130. While in communication with E-Node B 132a in E-UTRAN 130, UE 110 may periodically search for signals from nearby Node Bs and E-Node Bs in order to detect for any Node Bs and E-Node Bs that are better than the current serving E-Node B 132a. UE 110 may send measurement reports to AGW 134. In this example, UE 110 detects the signal from Node B 122c to be stronger than the signal from E-Node B 132a by a sufficient amount to merit handover from E-Node B 132a to Node B 122c.

Figure 3C:
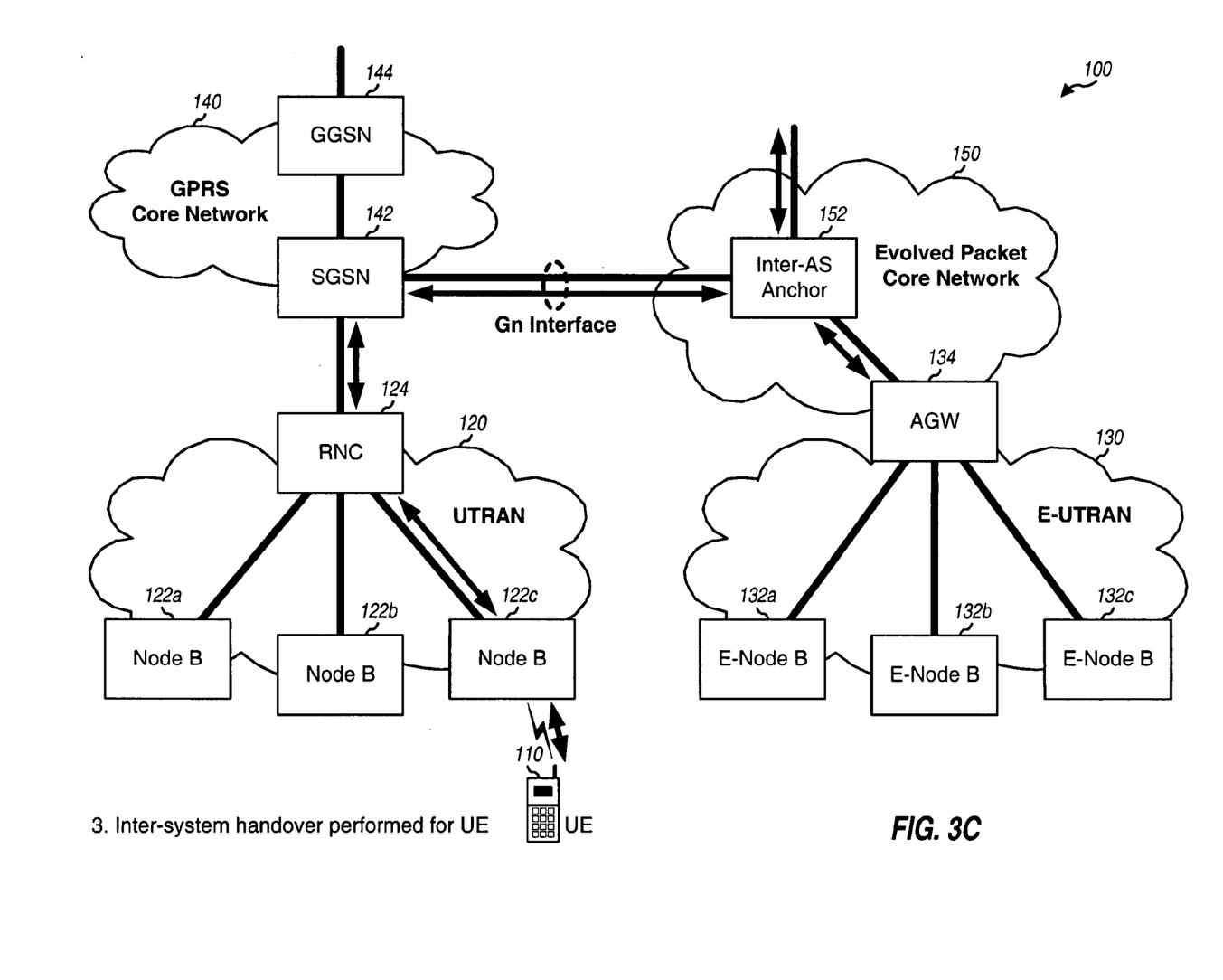

FIG. 3C shows inter-system handover of UE 110 from E-UTRAN 130 to UTRAN 120. The inter-system handover may be triggered based on received signal strength measurements made by UE 110 for Node Bs in UTRAN 120 and E-Node Bs in E-UTRAN 130. The inter-system handover may be performed as described below.

Figure 3D:
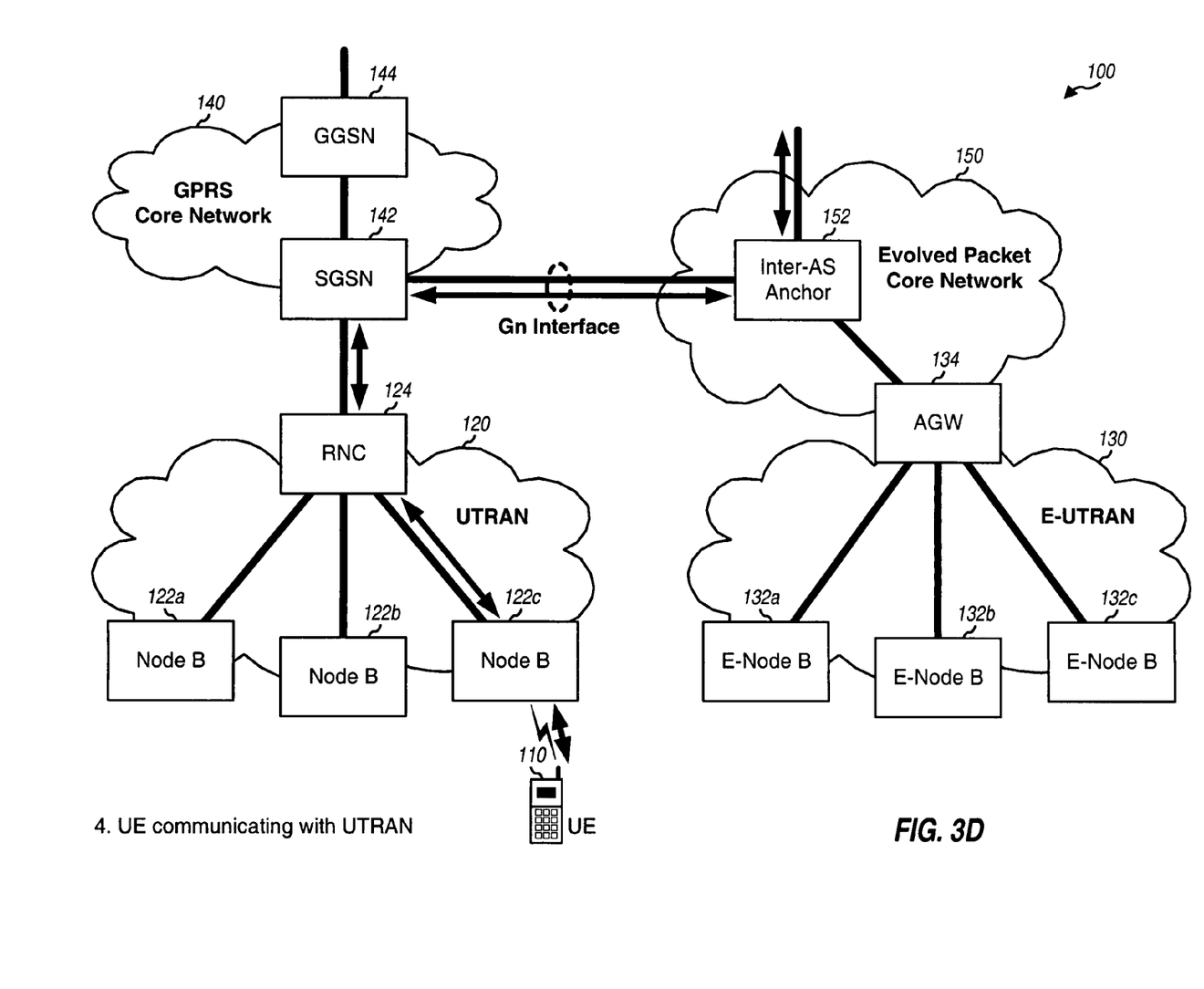

FIG. 3D shows UE 110 communicating with UTRAN 120 after completing the inter-system handover. User data is exchanged between UE 110 and SGSN 142, which forwards the data to via Inter-AS Anchor 152 acting as the GGSN.

In an embodiment, an inter-SGSN Serving Radio Network Subsystem (SRNS) relocation procedure is performed for the inter-system handover of UE 110 from E-UTRAN 130 to UTRAN 120. For this procedure, Inter-AS Anchor 152 facilitates message exchanges between SGSN 142 and AGW 134 in order to perform the handover. Inter-AS Anchor 152 communicates with SGSN 142 via the Gn interface and emulates (or appears as) another SGSN to SGSN 142. This emulation allows SGSN 142 to treat the inter-system handover as an inter-SGSN handover, which is handover of a UE from one SGSN to another SGSN in the UTRAN. SGSN 142 may then support inter-system handover using the same messages and internal procedures used for inter-SGSN handover. This minimizes the impact to SGSN 142 and other network entities in UTRAN 120 to support inter-system handover.

Figure 4:
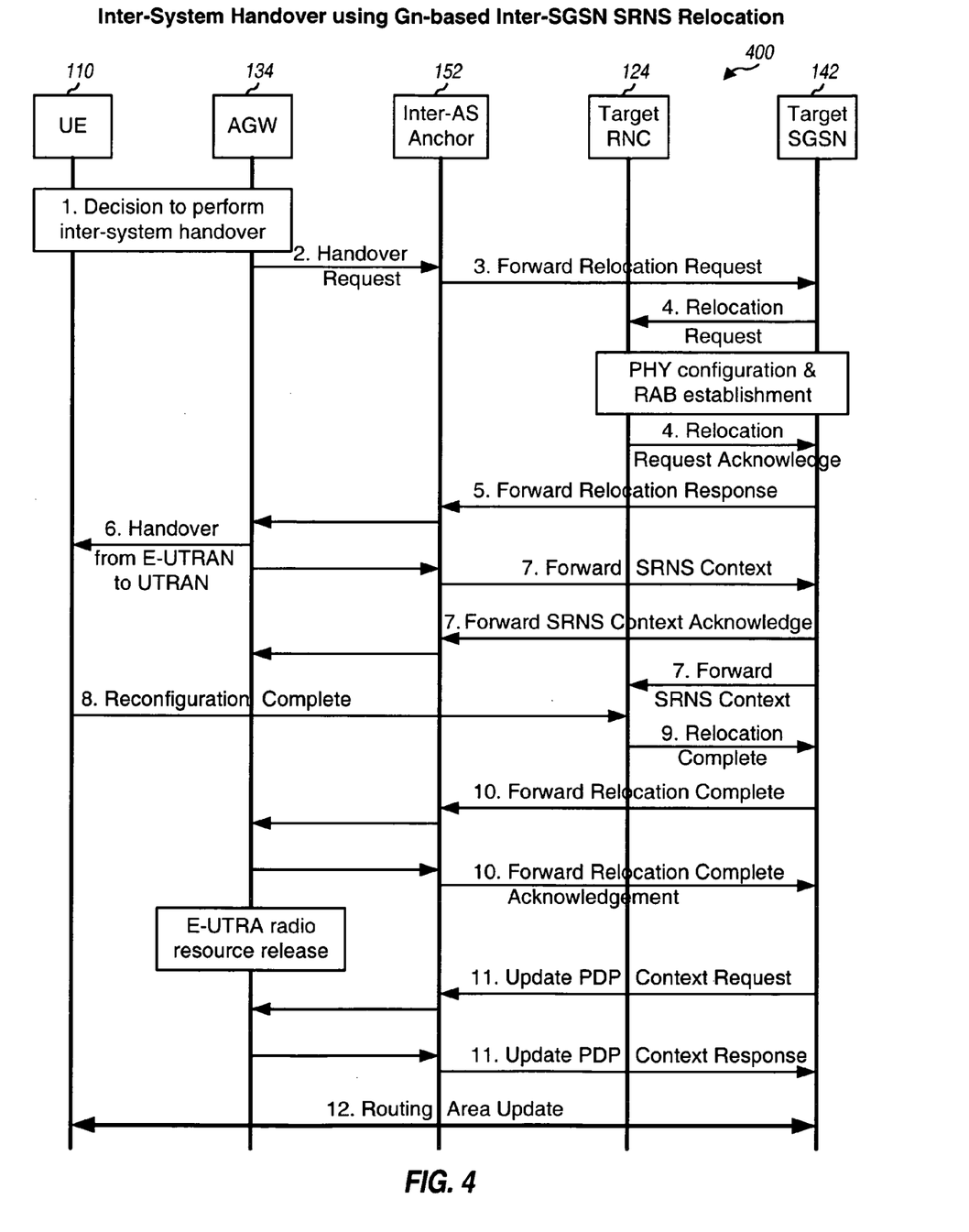
FIG. 4 shows an inter-SGSN SRNS relocation procedure.

FIG. 4 shows an embodiment of an inter-SGSN SRNS relocation procedure 400 for handover of UE 110 from E-UTRAN 130 to UTRAN 120. In procedure 400, AGW 134 is considered as a source RNC, Inter-AS Anchor 152 behaves as a source SGSN, RNC 142 is a target RNC, and SGSN 142 is a target SGSN of the handover.

Initially, AGW 134 makes a decision to perform inter-system handover of UE 110 based on measurement reports collected from the UE (step 1). AGW 134 sends a handover request message to Inter-AS Anchor 152 (step 2), which forwards the request in a Forward Relocation Request message to SGSN 142 (step 3). The Forward Relocation Request message contains the ID of target RNC 124 and identifies Inter-AS Anchor 152 as the source SGSN and the GGSN for the handover. SGSN 142 then sends a Relocation Request message to RNC 124 (step 4). RNC 124 and SGSN 142 thereafter exchange messages to configure the physical layer and establish Radio Access Bearers (RABs) for UE 110. RNC 124 establishes and configures RLC and PDCP for UE 110. After completing the PHY configuration and RAB establishment, RNC 124 sends a Relocation Request Acknowledge message to SGSN 142 (also step 4).

SGSN 142 then sends a Forward Relocation Response message to Inter-AS Anchor 152, which forwards the information in the message to AGW 134 (step 5). The Forward Relocation Response message indicates that resources for UE 110 have been assigned between SGSN 142 and RNC 124 in the legacy system, that RNC 124 is ready to receive data, and that SGSN 142 is ready for relocation of SRNS. AGW 134 then sends a message to UE 110 to handover from E-UTRAN 130 to UTRAN 120 (step 6).

AGW 134 continues the execution of the SRNS relocation by sending radio context to Inter-AS Anchor 152, which forwards the information in a Forward SRNS Context message to SGSN 142, which further forwards the information to RNC 124 (step 7). The radio context may include pertinent information used for radio communication, e.g., protocol state, quality of service (QoS) parameters, and so on. SGSN 142 returns a Forward SRNS Context Acknowledge message to Inter-AS Anchor 152, which forwards the acknowledgement to AGW 134 (also step 7). Lossless SRNS relocation may be performed, and AGW 134 may continue to forward packets for UE 110 to RNC 124 to avoid losing packets during SRNS switching (not shown in FIG. 4).

Upon receiving the handover message in step 6, UE 110 performs reconfiguration for the handover, e.g., brings down the protocol stacks for E-UTRAN 130 and brings up the protocol stacks for UTRAN 120. After UE 110 has reconfigured itself, the UE sends a Reconfiguration Complete message to RNC 124 (step 8). Upon receiving this message, RNC 124 sends a Relocation Complete message to SGSN 142 (step 9). SGSN 142 sends a Forward Relocation Complete message to Inter-AS Anchor 152, which forwards the information to AGW 134 (step 10). This message informs AGW 134 of the completion of the SRNS relocation procedure. AGW 134 returns an acknowledgement to Inter-AS Anchor 152, which forwards the acknowledgement in a Forward Relocation Complete Acknowledgement message to SGSN 142 (also step 10). AGW 134 then releases the radio resources for UE 110.

After receiving the Relocation Complete message in step 9, SGSN 142 sends an Update PDP Context Request message to Inter-AS Anchor 152, which forwards the request to AGW 134 (step 11). UE 110 may have established a call with E-UTRAN 130 by activating a Packet Data Protocol (PDP) context, which contains various parameters such as routing information for IP packets (e.g., the IP addresses of UE 110 and Inter-AS Anchor 152), QoS profiles, and so on. AGW 134 stores the PDP context for UE 110 during the call and, in response to the request from SGSN 142, forwards the PDP context to Inter-AS Anchor 152, which forwards the information in an Update PDP Context Response message to SGSN 142 (also step 11). Inter-AS Anchor 152 updates its PDP context fields for UE 110 so that future packets for the UE are forwarded to SGSN 142 instead of AGW 134. Step 11 switches the user plane from AGW 134 to RNC 124. In the first phase of the handover procedure and until the PDP context is updated in step 11, SGSN 142 communicates with Inter-AS Anchor 152, which acts as a source SGSN to SGSN 142. After the PDP context is updated, Inter-AS Anchor 152 acts as a GGSN to SGSN 142.

After completing SRNS relocation, UE 110 performs a routing area update procedure that involves Inter-AS Anchor 152 and SGSN 142 (step 12). Different radio access technologies may have different registration areas. UE 110 registers with UTRAN 120 via SGSN 142 so that the UTRAN can locate the UE later, if necessary.

Inter-AS Anchor 152 exchanges messages with AGW 134 and SGSN 142 for the inter-system handover. Inter-AS Anchor 152 communicates with SGSN 142 via the Gn interface and using messages described in 3GPP TS 29.060, entitled "GPRS Tunneling Protocol (GTP) across Gn and Gp interface," June 2006. Inter-AS Anchor 152 may communicate with AGW 134 via a suitable interface, e.g., an S5a interface being defined by 3GPP. The messages exchanged between Inter-AS Anchor 152 and AGW 134 are currently not defined by 3GPP and are not shown in FIG. 4. In general, the messages exchanged between Inter-AS Anchor 152 and AGW 134 may be any suitable messages and may be sent directly to SGSN 142 or may be encapsulated in some other messages prior to forwarding to SGSN 142. The handover message in step 6 may be defined to include pertinent information for the inter-system handover.

With procedure 400, UE 110 operates with new protocol stacks 230 and 232 prior to step 8 and with legacy protocol stacks 220 and 222 for step 8 and beyond. UE 110 may operate only one set of protocol stacks at any given moment and does not need to support both new and legacy protocol stacks at the same time, which may simplify UE operation.

Figure 5:
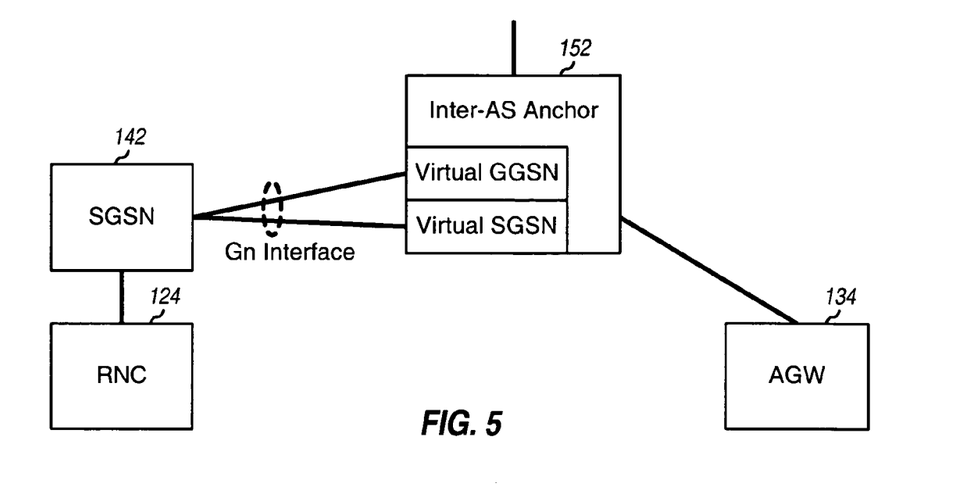
FIG. 5 shows the interface between an SGSN and an Inter-AS Anchor.

FIG. 5 shows the interface between SGSN 142 and Inter-AS Anchor 152. Inter-AS Anchor 152 emulates a virtual SGSN and a virtual GGSN and communicates with SGSN 142 via the Gn interface. Inter-AS Anchor 152 behaves as the source SGSN prior to updating the PDP context for UE 110 and behaves as a GGSN after updating the PDP context. The messages exchanged between SGSN 142 and Inter-AS Anchor 152 for procedure 400 are similar (or may be identical) to the messages exchanged between a new SGSN and an old SGSN for an inter-SGSN SRNS relocation procedure in UTRAN 120. Hence, SGSN 142 can support inter-system handover with existing messages and procedures.

FIG. 4 shows an exemplary procedure 400 for inter-system handover of UE 110 from E-UTRAN 130 to UTRAN 120. The inter-system handover may also be performed with other procedures and/or other message flows. Furthermore, the messages may be sent in various orders. In general, Inter-AS Anchor 152 may emulate any network entity that is recognized by SGSN 142, which may then allow SGSN 142 to use an existing procedure to support inter-system handover. If Inter-AS Anchor 152 emulates an SGSN and communicates with SGSN 142 via the Gn interface, then inter-system handover complexity may be reduced for Inter-AS Anchor 152, AGW 134 and UE 110. The Gn interface is IP based and operates at higher layer. Hence, Inter-AS Anchor 152 and AGW 134 can terminate the messages from SGSN 142 at IP layer. Inter-AS Anchor 152 may also emulate an RNC and communicates with SGSN 142 via an Iu interface, which operates at RRC, RLC, and MAC. However, the complexity of Inter-AS Anchor 152 would increase to terminate RRC, RLC, and MAC, the complexity of AGW 134 would increase to support two data tunnels during handover, and the complexity of UE 110 would also increase to concurrently support new and legacy protocol stacks during handover.

The inter-system handover techniques may be used for handover from an E-UTRAN to a UTRAN, as described above. UTRANs may be more extensively deployed than E-UTRANs, particularly during early deployment phase of E-UTRANs. The techniques allow UEs to be handed over from E-UTRANs to UTRANs and continue to receive communication services upon moving outside the coverage of the E-UTRANs.

The inter-system handover techniques may also be used for handover from a UTRAN to an E-UTRAN. In this case, Inter-AS Anchor 152 may behave as a target SGSN and exchange messages with a source SGSN to achieve handover. The message flow in FIG. 4 may be used for handover from the UTRAN to the E-UTRAN, albeit with AGW 134 in procedure 400 being replaced with a source RNC in the UTRAN, Inter-AS Anchor 152 being replaced by the old SGSN, target RNC 124 being replaced by AGW 134, and target SGSN 142 being replaced by Inter-AS Anchor 152. The source RNC may send an RRC message to UE 110 step 6, and UE 110 may send another RRC message to AGW 134 in step 8.

The inter-system handover techniques may also be used for handover from an E-UTRAN to other RANs such as a GSM/EDGE RAN (GERAN). A message flow similar to the one shown in FIG. 4 may be used, albeit with different network entities and messages.

The inter-system handover techniques may allow for smooth inter-operability between E-UTRANs and UTRANs with little or no impact on the legacy system. The techniques may also reduce impact on the new system and the UEs. The techniques may also be able to perform handover with small interruption time.

Figure 6:
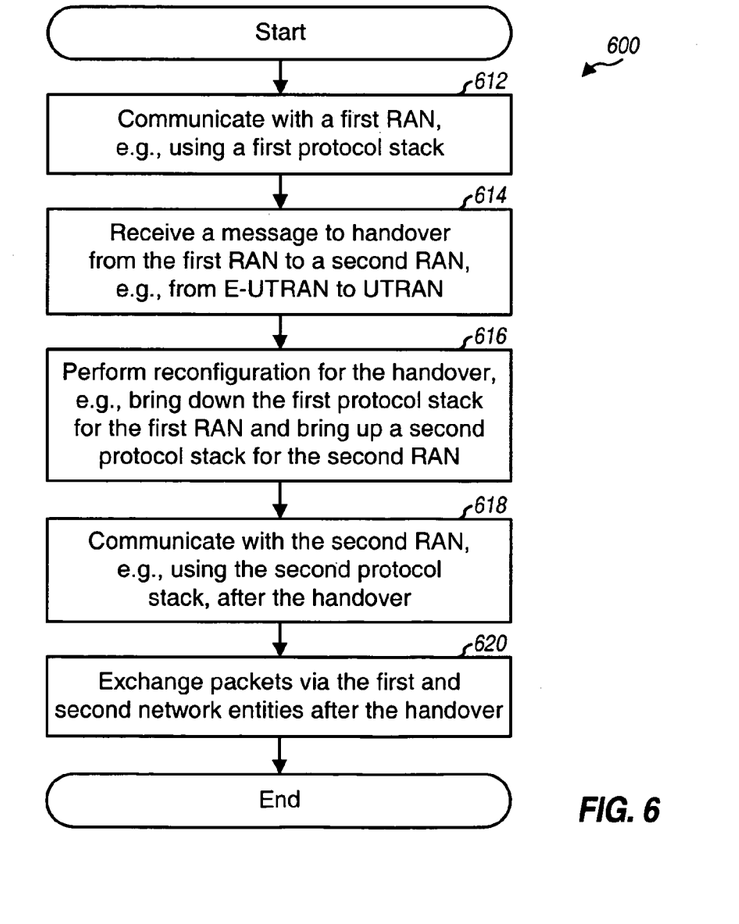
FIG. 6 shows a process performed by the UE for inter-system handover.

FIG. 6 shows an embodiment of a process 600 performed by a UE for inter-system handover. The UE initially communicates with a first RAN, e.g., using a first protocol stack (block 612). The UE receives a message to handover from the first RAN to a second RAN (block 614). The first RAN may be an E-UTRAN, and the second RAN may be a UTRAN. The first and second RANs may also be other RANs. The handover is achieved by messages exchanged between a first network entity (e.g., an Inter-AS Anchor) for the first RAN and a second network entity (e.g., an SGSN) for the second RAN via a Gn interface. The UE performs reconfiguration for the handover, e.g., brings down the first protocol stack for the first RAN and brings up a second protocol stack for the second RAN (block 616). The UE may break communication with the first RAN before making communication with the second RAN. The UE communicates with the second RAN after the handover, e.g., using the second protocol stack (block 618). The UE may exchange packets via the first and second network entities (e.g., the Inter-AS Anchor and SGSN) after the handover to the second RAN (block 620).

Figure 7:
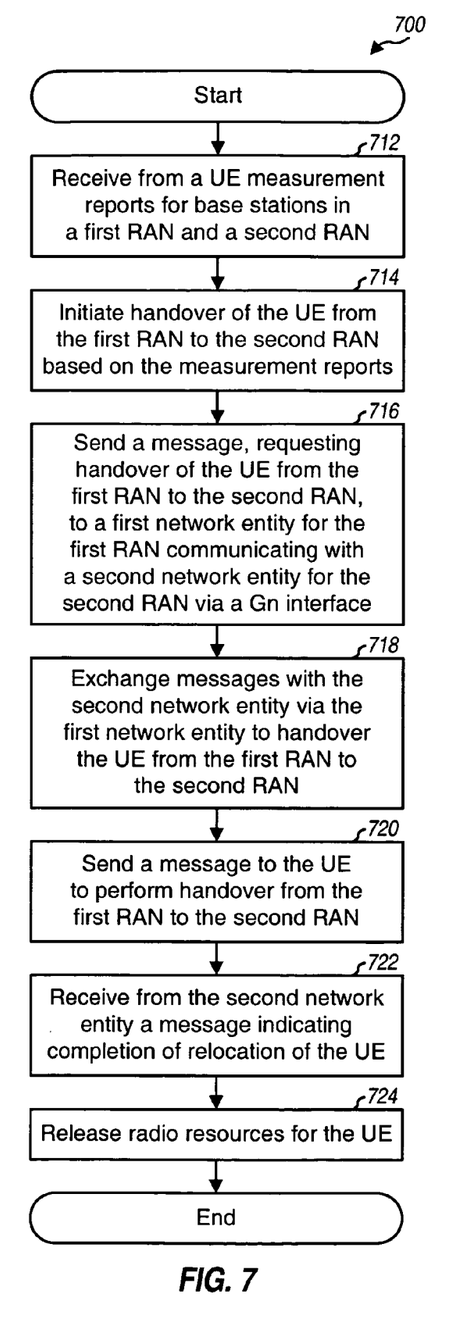
FIG. 7 shows a process performed by an AGW for inter-system handover.

FIG. 7 shows an embodiment of a process 700 performed by an AGW to support inter-system handover. Measurement reports are received from a UE for base stations in a first RAN and a second RAN (block 712). The first RAN may be an E-UTRAN, and the second RAN may be a UTRAN. The first and second RANs may also be other RANs. Handover of the UE from the first RAN to the second RAN is initiated based on the measurement reports (block 714). A message requesting handover of the UE from the first RAN to the second RAN is then sent to a first network entity (e.g., an Inter-AS Anchor) for the first RAN communicating with a second network entity (e.g., an SGSN) for the second RAN via a Gn interface (block 716).

Messages are exchanged with the second network entity via the first network entity to handover the UE from the first RAN to the second RAN (block 718). Radio context and PDP context for the UE may be forwarded to the second network entity. The radio context may be used to establish radio access bearers for the UE. The PDP context may be used to route data for the UE. A message is sent to the UE to perform handover from the first RAN to the second RAN (block 720). A message indicating completion of relocation of the UE is received from the second network entity (block 722). Radio resources for the UE are then released (block 724).

Figure 8:
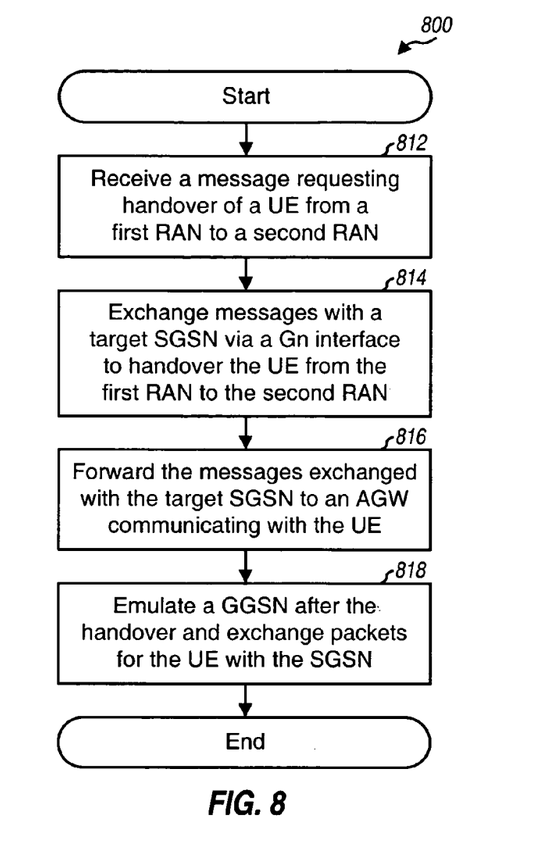
FIG. 8 shows a process performed by an Inter-AS Anchor for inter-system handover.

FIG. 8 shows an embodiment of a process 800 performed by an Inter-AS Anchor to support inter-system handover. A message requesting handover of a UE from a first RAN to a second RAN is received (block 812). The first RAN may be an E-UTRAN, and the second RAN may be a UTRAN. The first and second RANs may also be other RANs. Messages are exchanged with a target SGSN via a Gn interface to handover the UE from the first RAN to the second RAN (block 814). The messages exchanged with the target SGSN are forwarded to an AGW for the first RAN and communicating with the UE (block 816). The exchanged messages may be for an inter-SGSN SRNS relocation procedure that treats the handover from the first RAN to the second RAN as a handover between two SGSNs.

The Inter-AS Anchor may emulate a source SGSN for the messages exchanged with the target SGSN. The Inter-AS Anchor may emulate a GGSN after the handover to the second RAN and may exchange packets for the UE with the SGSN (block 818). The Inter-AS Anchor may store PDP context for the UE and forward packets for the UE in accordance with the PDP context.

Figure 9:
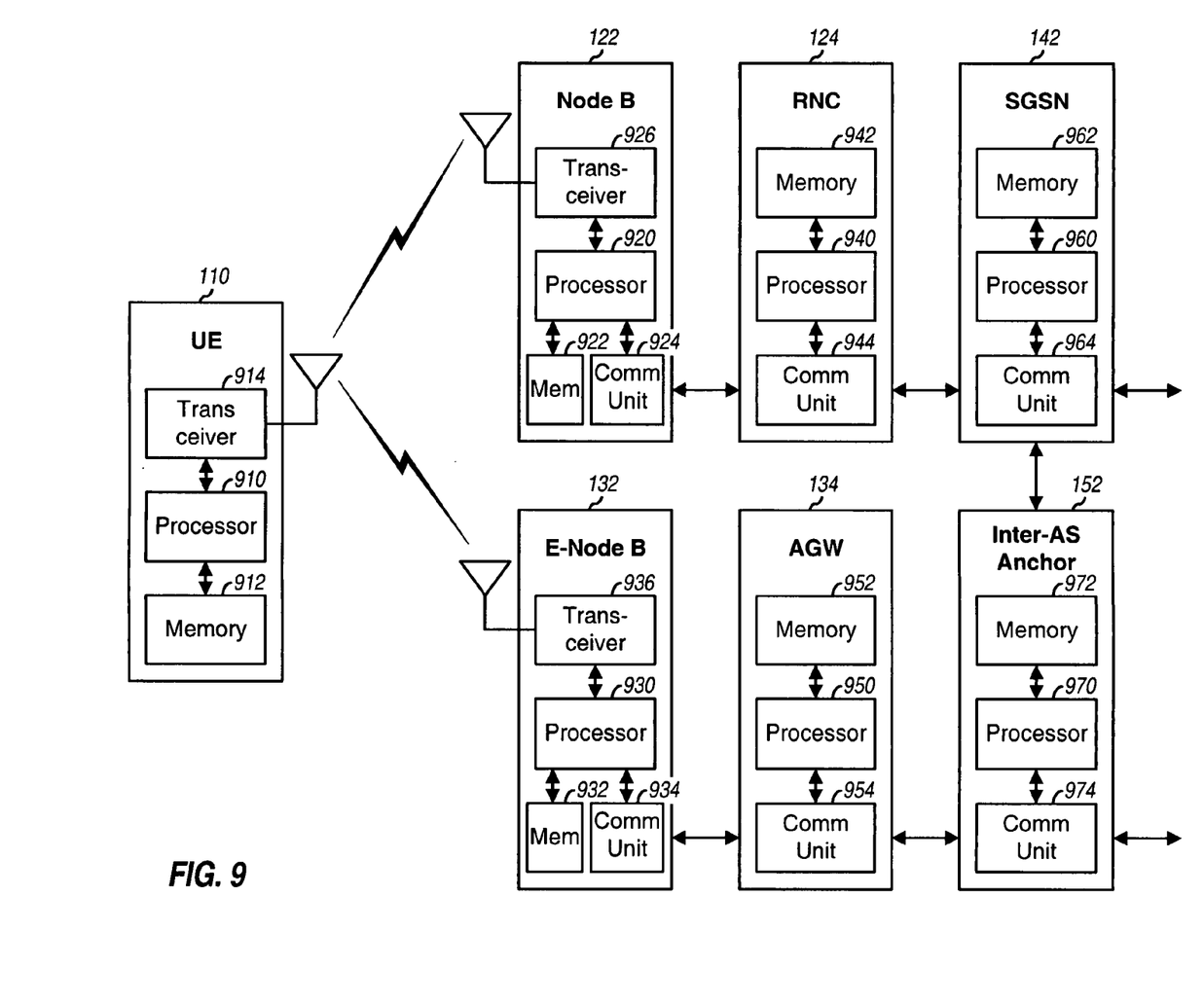
FIG. 9 shows a block diagram of the UE and various network entities.

FIG. 9 shows a block diagram an embodiment of UE 110 and various network entities in FIG. 1. On the uplink, UE 110 may transmit data and signaling to one or more Node Bs in UTRAN 120 and/or one or more E-Node Bs in E-UTRAN 130. The data and signaling are processed by a processor 910 and conditioned by a transceiver 914 to generate an uplink signal, which is transmitted. At Node B 122 and/or E-Node B 132, the uplink signals from UE 110 and other UEs are received and conditioned by transceivers 926 and 936, respectively, and further processed by processors 920 and 930, respectively, to recover the uplink data and signaling sent by the UEs.

On the downlink, Node B 122 and E-Node B 132 transmit data and signaling to the UEs within their coverage area. At Node B 122, the data and signaling are processed by processor 920 and conditioned by transceiver 926 to generate a downlink signal, which is transmitted to the UEs. At E-Node B 132, the data and signaling are processed by processor 930 and conditioned by transceiver 936 to generate a downlink signal, which is transmitted to the UEs. At UE 110, the downlink signals from the Node Bs and E-Node Bs are received and conditioned by transceiver 914 and further processed by processor 910 to recover the downlink data and signaling.

Memories 912, 922 and 932 store program codes and data for UE 110, Node B 122 and E-Node B 132, respectively. Communication (Comm) unit 924 and 934 allow Node B 122 and E-Node B 132 to communicate with RNC 124 and AGW 134, respectively. For inter-system handover, processor 910 at UE 110 may perform process 600 in FIG. 6 and the processing for UE 110 in FIG. 4.

RNC 124 includes a processor 940, a memory 942, and a Comm unit 944. AGW 134 includes a processor 950, a memory 952, and a Comm unit 954. SGSN 142 includes a processor 960, a memory 962, and a Comm unit 964. Inter-AS Anchor 152 includes a processor 970, a memory 972, and a Comm unit 974. For each network entity, the processor performs pertinent processing for that network entity, the memory stores program codes and data, and the Comm unit supports communication with other network entities via appropriate interfaces. Processor 950 at AGW 134 may perform process 700 in FIG. 7 and the processing for AGW 134 in FIG. 4 for inter-system handover. Processor 970 may perform process 800 in FIG. 8 and the processing for Inter-AS Anchor 152 in FIG. 4 for inter-system handover. Processor 960 may perform the processing for SGSN 142 in FIG. 4 for inter-system handover. Comm unit 974 may communicate with SGSN 142 via a Gn interface and may communicate with AGW 134 and external network via other interfaces.

In general, each entity may include any number of processors, memories, communication units, transceivers, controllers, and so on.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. An apparatus in an evolved packet core (EPC) network, the apparatus comprising:
    at least one processor configured
        to communicate with a first radio access network (RAN),
        to receive a message to handover from the first RAN to a second RAN, the handover being performed by messages exchanged between an inter access system anchor (Inter-AS Anchor) of the EPC network associated with the first RAN and a serving general packet radio service (GPRS) support node (SGSN) associated with the second RAN via a GPRS tunneling protocol (GTP) across a Gn interface wherein the Gn interface is a legacy interface between a SGSN and a gateway GPRS support node (GGSN) within a GPRS network and wherein the Inter-AS Anchor uses the Gn interface to emulates another SGSN in order to communicate with the SGSN associated with the second RAN, and
to communicate with the second RAN after the handover; and
a memory coupled to the at least one processor.

2. The apparatus of claim 1, wherein the at least one processor communicates with the first RAN using a first protocol stack and communicates with the second RAN using a second protocol stack.

3. The apparatus of claim 1, wherein the at least one processor breaks communication with the first RAN and then makes communication with the second RAN.

4. The apparatus of claim 1, wherein the at least one processor exchanges packets via the Inter-AS Anchor and the SGSN after the handover to the second RAN.

5. The apparatus of claim 1, wherein the second RAN is a Universal Terrestrial Radio Access Network (UTRAN) and the first RAN is an Evolved UTRAN (E-UTRAN).

6. A method comprising:
communicating with a first radio access network (RAN);
receiving a message to handover from the first RAN to a second RAN, the handover being performed by messages exchanged between an inter access system anchor (Inter-AS Anchor) of an evolved packet core (EPC) network associated with the first RAN and a serving general packet radio service (GPRS) support node (SGSN) associated with the second RAN via a GPRS tunneling protocol (GTP) across a Gn interface wherein the Gn interface is a legacy interface between a SGSN and a gateway GPRS support node (GGSN) within a GPRS network and wherein the Inter-AS Anchor uses the Gn interface to emulates another SGSN in order to communicate with the SGSN associated with the second RAN; and
communicating with the second RAN after the handover.

7. The method of claim 6, wherein the communicating with the first RAN comprises communicating with the first RAN using a first protocol stack, and wherein the communicating with the second RAN comprises communicating with the second RAN using a second protocol stack.

8. An apparatus in an evolved packet core (EPC) network, the apparatus comprising:
means for communicating with a first radio access network (RAN);
means for receiving a message to handover from the first RAN to a second RAN, the handover being performed by messages exchanged between an inter access system anchor (Inter-AS Anchor) of the EPC network associated with the first RAN and a serving general packet radio service (CPRS) support node (SGSN) associated with the second RAN via a CPRS tunneling protocol (GTP) across a Gn interface wherein the Gn interface is a legacy interface between a SGSN and a gateway CPRS support node (GGSN) within a CPRS network and wherein the Inter-AS Anchor uses the Gn interface to emulates another SGSN in order to communicate with the SGSN associated with the second RAN; and
means for communicating with the second RAN after the handover.

9. The apparatus of claim 8, wherein the means for communicating with the first RAN comprises means for communicating with the first RAN using a first protocol stack, and wherein the means for communicating with the second RAN comprises means for communicating with the second RAN using a second protocol stack.

10. An apparatus comprising:
at least one processor configured
to send a message requesting handover of a user equipment (UE) from a first radio access network (RAN) to a second RAN, the message being sent to an inter access system anchor (Inter-AS Anchor) of an evolved packet core (EPC) network associated with the first RAN communicating with a serving general packet radio service (CPRS) support node (SGSN) associated with the second RAN via a CPRS tunneling protocol (GTP) across a Gn interface wherein the Gn interface is a legacy interface between a SGSN and a gateway CPRS support node (GGSN) within a CPRS network and wherein the Inter-AS Anchor uses the Gn interface to emulates another SGSN in order to communicate with the SGSN associated with the second RAN,
to exchange messages with the SGSN via the Inter-AS Anchor to handover the UE from the first RAN to the second RAN, and
to send a message to the UE to perform handover from the first RAN to the second RAN; and
a memory coupled to the at least one processor.

11. The apparatus of claim 10, wherein the at least one processor receives measurement reports from the UE for base stations in the first RAN and the second RAN, and initiates handover of the UE from the first RAN to the second RAN based on the measurement reports.

12. The apparatus of claim 10, wherein the at least one processor receives from the SGSN a message indicating completion of relocation of the UE, and releases radio resources for the UE.

13. The apparatus of claim 10, wherein the at least one processor forwards radio context for the UE to the SGSN via the Inter-AS Anchor.

14. The apparatus of claim 10, wherein the at least one processor forwards Packet Data Protocol (PDP) context for the UE to the second network entity via the first network entity.

15. A method comprising:
sending a message requesting handover of a user equipment (UE) from a first radio access network (RAN) to a second RAN, the message being sent to an inter access system anchor (Inter-AS Anchor) of an evolved packet core (EPC) network associated with the first RAN communicating with a serving general packet radio service (CPRS) support node (SGSN) associated with the second RAN via a CPRS tunneling protocol (GTP) across a Gn interface wherein the Gn interface is a legacy interface between a SGSN and a gateway CPRS support node (GGSN) within a CPRS network and wherein the Inter-AS Anchor uses the Gn interface to emulates another SGSN in order to communicate with the SGSN associated with the second RAN;
exchanging messages with the SGSN via the Inter-AS Anchor to handover the UE from the first RAN to the second RAN; and
sending a message to the UE to perform handover from the first RAN to the second RAN.

16. The method of claim 15, further comprising:
forwarding radio context for the UE to the SGSN via the Inter-AS Anchor.

17. The method of claim 15, further comprising:
forwarding Packet Data Protocol (PDP) context for the UE to the SGSN via the Inter-AS Anchor.

18. An apparatus comprising:
means for sending a message requesting handover of a user equipment (UE) from a first radio access network (RAN) to a second RAN, the message being sent to an inter access system anchor (Inter-AS Anchor) of an evolved packet core (EPC) network associated with the first RAN communicating with a serving general packet radio service (CPRS) support node (SGSN) associated with the second RAN via a CPRS tunneling protocol (GTP) across a Gn interface wherein the Gn interface is a legacy interface between a SGSN and a gateway CPRS support node (GGSN) within a CPRS network and wherein the Inter-AS Anchor uses the Gn interface to emulates another SGSN in order to communicate with the SGSN associated with the second RAN;
means for exchanging messages with the SGSN via the Inter-AS Anchor to handover the UE from the first RAN to the second RAN; and
means for sending a message to the UE to perform handover from the first RAN to the second RAN.

19. The apparatus of claim 18, further comprising:
means for forwarding radio context for the UE to the SGSN via the Inter-AS Anchor.

20. The apparatus of claim 18, further comprising:
means for forwarding Packet Data Protocol (PDP) context for the UE to the SGSN via the Inter-AS Anchor.

21. An apparatus in an evolved packet core (EPC) network, the apparatus comprising:
at least one processor configured
to receive a message requesting handover of a user equipment (UE) from a first radio access network (RAN) to a second RAN, the message being received at an inter access system anchor (Inter-AS Anchor) of the EPC network associated with the first RAN communicating with a target serving general packet radio service (CPRS) support node (SGSN) associated with the second RAN via a CPRS tunneling protocol (GTP) across a Gn interface wherein the Gn interface is a legacy interface between a SGSN and a gateway CPRS support node (GGSN) within a CPRS network and wherein the Inter-AS Anchor uses the Gn interface to emulates another SGSN in order to communicate with the SGSN associated with the second RAN, and
to exchange messages with the target SGSN via the Gn interface to handover the UE from the first RAN to the second RAN; and
a memory coupled to the at least one processor.

22. The apparatus of claim 21, wherein the at least one processor emulates a source SGSN for the exchange of messages with the target SGSN.

23. The apparatus of claim 21, wherein the at least one processor participates in an inter-SGSN Serving Radio Network Subsystem (SRNS) relocation procedure that treats the handover from the first RAN to the second RAN as a handover between two SGSNs.

24. The apparatus of claim 21, wherein the at least one processor forwards the messages exchanged with the target SGSN to an Access Gateway (AGW) for the first RAN and communicating with the UE.

25. The apparatus of claim 21, wherein the at least one processor emulates a Gateway GPRS Support Node (GGSN) after the handover to the second RAN, and exchanges packets for the UE with the target SGSN.

26. The apparatus of claim 21, wherein the memory stores Packet Data Protocol (PDP) context for the UE, and wherein the at least one processor forwards packets for the UE in accordance with the PDP context.

27. The apparatus of claim 21, wherein the second RAN is a Universal Terrestrial Radio Access Network (UTRAN) and the first RAN is an Evolved UTRAN (E-UTRAN).

28. The apparatus of claim 21, wherein the first RAN is a Universal Terrestrial Radio Access Network (UTRAN) and the second RAN is an Evolved UTRAN (E-UTRAN).

29. A method comprising:
receiving a message requesting handover of a user equipment (UE) from a first radio access network (RAN) to a second RAN, the message being received at an inter access system anchor (Inter-AS Anchor) of an evolved packet core (EPC) network associated with the first RAN communicating with a target serving general packet radio service (GPRS) support node (SGSN) associated with the second RAN via a GPRS tunneling protocol (GTP) across a Gn interface wherein the Gn interface is a legacy interface between a SGSN and a gateway GPRS support node (GGSN) within a GPRS network and wherein the Inter-AS Anchor uses the Gn interface to emulates another SGSN in order to communicate with the SGSN associated with the second RAN; and
exchanging messages with the target SGSN via the Gn interface to handover the UE from the first RAN to the second RAN.

30. The method of claim 29, further comprising:
emulating a source SGSN for the exchange of messages with the target SGSN.

31. The method of claim 29, further comprising:
emulating a Gateway CPRS Support Node (GGSN) after the handover to the second RAN; and
exchanging packets for the UE with the target SGSN.

32. An apparatus in an evolved packet core (EPC) network, the apparatus comprising:
means for receiving a message requesting handover of a user equipment (UE) from a first radio access network (RAN) to a second RAN, the message being received at an inter access system anchor (Inter-AS Anchor) of the EPC network associated with the first RAN communicating with a target serving general packet radio service (CPRS) support node (SGSN) associated with the second RAN via a CPRS tunneling protocol (GTP) across a Gn interface wherein the Gn interface is a legacy interface between a SGSN and a gateway CPRS support node (GGSN) within a CPRS network and wherein the Inter-AS Anchor uses the Gn interface to emulates another SGSN in order to communicate with the SGSN associated with the second RAN; and
means for exchanging messages with the target SGSN via the Gn interface to handover the UE from the first RAN to the second RAN.

33. The apparatus of claim 32, further comprising:
means for emulating a source SGSN for the exchange of messages with the target SGSN.

34. The apparatus of claim 32, further comprising:
means for emulating a Gateway CPRS Support Node (GGSN) after the handover to the second RAN; and
means for exchanging packets for the UE with the target SGSN.

* * * * *